United States Patent
Goodwin

(10) Patent No.: US 7,216,125 B2
(45) Date of Patent: May 8, 2007

(54) METHODS AND APPARATUS FOR PRE-FILTERED ACCESS CONTROL IN COMPUTING SYSTEMS

(75) Inventor: Richard Thomas Goodwin, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 10/245,610

(22) Filed: Sep. 17, 2002

(65) Prior Publication Data

US 2004/0054663 A1   Mar. 18, 2004

(51) Int. Cl.
G06F 7/00 (2006.01)
G06F 17/30 (2006.01)

(52) U.S. Cl. ............................................ 707/9
(58) Field of Classification Search ................ 707/9
See application file for complete search history.

(56) References Cited

U.S. PATENT DOCUMENTS

| | | | | |
|---|---|---|---|---|
| 6,014,666 | A | | 1/2000 | Helland et al. ............... 707/9 |
| 6,055,637 | A | * | 4/2000 | Hudson et al. ............... 726/20 |
| 6,161,139 | A | * | 12/2000 | Win et al. .................... 709/225 |
| 6,202,066 | B1 | * | 3/2001 | Barkley et al. ................ 707/9 |
| 6,237,036 | B1 | | 5/2001 | Ueno et al. ................... 709/225 |
| 6,311,269 | B2 | * | 10/2001 | Luckenbaugh et al. ...... 713/154 |
| 6,389,589 | B1 | * | 5/2002 | Mishra et al. ............... 717/170 |
| 6,487,552 | B1 | * | 11/2002 | Lei et al. ....................... 707/4 |
| 6,516,317 | B1 | * | 2/2003 | Samar et al. .................. 707/9 |
| 6,578,037 | B1 | * | 6/2003 | Wong et al. .................. 707/10 |
| 6,587,854 | B1 | * | 7/2003 | Guthrie et al. ................ 707/9 |
| 6,591,265 | B1 | * | 7/2003 | Erickson et al. ............... 707/9 |
| 6,631,371 | B1 | * | 10/2003 | Lei et al. ....................... 707/4 |
| 6,745,332 | B1 | * | 6/2004 | Wong et al. .................. 713/201 |
| 6,928,427 | B2 | * | 8/2005 | Rajasekaran et al. ......... 707/2 |

(Continued)

OTHER PUBLICATIONS

Giuri, L. and P. Iglio "Role Templates for Content-Based Access Control", Proceedings of the 2nd ACM Workshop on Role-Based Access Control, 1997, pp. 153-159.*

(Continued)

*Primary Examiner*—Luke S. Wassum
(74) *Attorney, Agent, or Firm*—Anne V. Dougherty; Ryan, Mason & Lewis, LLP

(57) ABSTRACT

An automated technique implemented in a computer system for selecting one or more resources on which a principal is authorized to perform at least one action comprises the following steps/operations. First, one or more authorization policies that apply to a given principal are selected. Then, the one or more authorization policies are transformed based on meta-information associated with the one or more resources so as to form a query against a resource store that selects the one or more resources on which the one or more authorization policies allow the given principal to perform the at least one action. The query may then be executed to select the one or more resources from the resource store. In another automated technique, the query may be formed without use of the one or more authorization policies, but where the policies are used to remove unauthorized resources from the superset of resources returned as a result of query execution. The techniques may return no resources on which the user is allowed to perform an action, if, for example, no such resources are stored in the resource store. Also, it may also be that no authorization policy applies to the user.

15 Claims, 3 Drawing Sheets

U.S. PATENT DOCUMENTS

| | | | |
|---|---|---|---|
| 2002/0178271 A1* | 11/2002 | Graham et al. | 709/229 |
| 2003/0014394 A1* | 1/2003 | Fujiwara et al. | 707/3 |
| 2003/0229623 A1* | 12/2003 | Chang et al. | 707/3 |
| 2003/0236781 A1* | 12/2003 | Lei et al. | 707/3 |
| 2003/0236782 A1* | 12/2003 | Wong et al. | 707/5 |
| 2004/0003132 A1* | 1/2004 | Stanley et al. | 709/316 |
| 2004/0139043 A1* | 7/2004 | Lei et al. | 707/1 |
| 2005/0038783 A1* | 2/2005 | Lei et al. | 707/5 |

OTHER PUBLICATIONS

IBM "Creating a Successful Business-to-Business e-Marketplace", white paper, Oct. 2000.*

IBM "What's New in Version 5.1", technical publication, 2000.*

IBM "IBM WebSphere Commerce Suite, Marketplace Edition", product brochure, Jan. 2001.*

IBM IBM WebSphere™ Commerce Suite Version for AIX Marketplace Edition 4.2 Reference Guide, Feb. 2001, pp. 1-10 and 52-55.*

Jones, T. "Making the Transition to 5.1 is a Big Step, but the Functionality You'll Gain is Worth the Pain", WebSphere Advisor, Apr. 2001, pp. 23-26.*

IBM WebSphere™ Commerce Suite Marketplace Edition Version 4.2 Getting Started Guide, Apr. 2001.*

IBM WebSphere Commerce Suite Version 4.1 Marketplace Edition Marketplace Administrator's Guide, May 2001.*

IBM "IBM WebSphere™ Commerce Suite Marketplace Edition Version 4.2 Administrator's Guide", May 2001.*

Goodwin, R., S.F. Goh and F.Y. Wu "Instance-Level Access Control for Business-to-Business Electronic Commerce", IBM Systems Journal, vol. 41, No. 2, 2002.*

IBM "WebSphere Commerce Version Profiles and Prerequisites", downloaded from www-306.ibm.com/software/genservers/commerce/servers/versions.html, Sep. 22, 2004.*

IBM "WebSphere Commerce Access Control Policies", help pages, undated, downloaded Mar. 3, 2005.*

Lunt, T.F. et al. "The SeaView Security Model", IEEE Transactions on Software Engineering, vol. 16, No. 6, Jun. 1990, pp. 593-606.*

Castano, S., M. Fugini, G. Martella and P. Samarati "Database Security", ACM Press, 1994, ISBN 0-201-59375-0; QA76.9. D314S55 1994; Chapter 2, pp. 39-142.*

Davidson, M.A. "Creating Virtual Private Databases with Oracle8i", Oracle Magazine, Jul. 1999.*

Ferraiolo, D.F., J.F. Barkley and D.R. Kuhn "A Role-Based Access Control Model and Reference Implementation Within a Corporate Intranet", ACM Transactions on Information and System Security, vol. 2, No. 1, Feb. 1999, pp. 34-64.*

Sandhu, R.S., E.J. Coyne, H.L. Feinstein and C.E. Youman "Role-Based Access Control Models", IEEE Computer, Feb. 1996, pp. 38-47.*

Didriksen, T. "Rule-Based Database Access Control", Proceedings of the 2nd ACM Workshop on Role-Based Access Control, 1997, pp. 143-151.*

Kyte, T. "Fine Grained Access Control (aka DBMS RLS)", Oracle Magazine, Jun. 1999, downloaded from govt.oracle.com/~tkyte/article2/.*

Lupu, E.C. and M. Sloman "Conflicts in Policy-Based Distributed System Management", IEEE Transactions on Software Engineering, vol. 25, No. 6, Nov./Dec. 1999, pp. 852-869.*

Bird, P. "Implementing Low Level Access Control With DB2 UDB", The IDUG Solutions Journal, vol. 7, No. 3, Winter 2000.*

Bonatti, P.A., E. Damiani, S. De Capitani di Vemercati and P. Samarati "A Component-Based Architecture for Secure Data Publication", Proceedings of the 17th Annual Computer Security Applications Conference, Dec. 10-14, 2001, pp. 309-318.*

Jaeger, T., X. Zhang and A. Edwards "Policy Management Using Access Control Spaces", ACM Transactions on Information and System Security, vol. 6, No. 3, Aug. 2003, pp. 327-364.*

Gao, L. "A Toolkit for Automated Fine-Grained Access Control Policy Enforcement un Oracle 9i", MS Thesis, North Carolina State University, Department of Computer Science, Aug. 2004.*

Oracle "Oracle Virtual Private Database: An Oracle Database 10g Release 2 White Paper", Jun. 2005.*

U.S. Appl. No. 09/624,399, filed Jul. 24, 2000, "Instance Level Access Control Based on Instance Relative Roles".

R. Goodwin et al., "Instance-Level Access Control for Business-to-Business Electronic Commerce," IBM Systems Journal, vol. 41, No. 2, 2002.

* cited by examiner

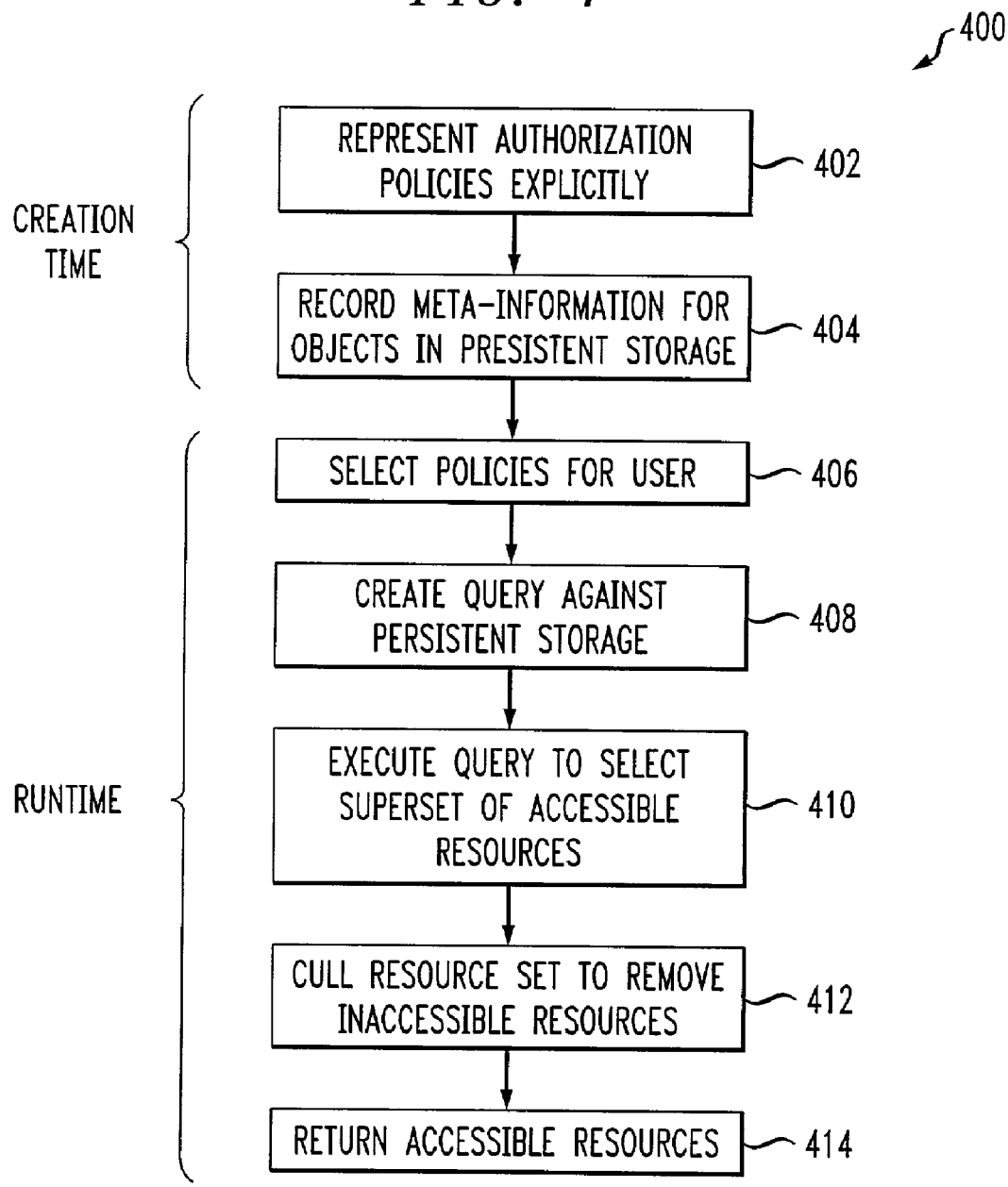

METHODS AND APPARATUS FOR PRE-FILTERED ACCESS CONTROL IN COMPUTING SYSTEMS

FIELD OF THE INVENTION

The present invention relates to computing systems and, more particularly, to methods and apparatus for providing pre-filtered access control or authorization with respect to principals, e.g., users or computer programs, attempting to access resources associated with such computing systems.

BACKGROUND OF THE INVENTION

In computing systems, instance level access control, also known as instance level authorization, resource level authorization and fine grained control, is used to determine if a given principal, e.g., a user or a computer program, has authorization to perform a given task on a given instance of a resource. For example, instance level access control can be used to determine if a given user has the authority to modify a given organization profile in a computer system.

Access is usually determined either by making a specific call to determine if authorization has been granted or by trying to perform the action and having the authorization system throw an exception if access is not allowed. Either of these approaches works well if considering only a single instance of a resource. The main problem is how to efficiently generate a list of resources to which a user can apply an action.

The obvious solution would be to fetch all such resources from persistent storage and then test each one individually, filtering out those that did not pass the test. However, this is far too inefficient for large sets of resources. Alternative solutions have been proposed and are addressed below.

The most common way to deal with the problem of efficiently listing a set of resources to which a person has access is to hard code the access control policy into the application code, in the form of a query, and have the application simply execute the query. A problem with this approach is that it does not allow for externalization of the authorization decision and requires recoding of the application each time the policy changes.

Instead of using policy-based authorization, a system may use explicit access control lists. An access control list is a list of users and actions attached to each resource. A user can perform an action on a resource only if a pairing including the user and the action appears on the list. To select the set of resources a user can access, the system simply selects all resources where the user and action appear on the list. Access control lists may also include pairings of user groups and actions. In which case, the selected set of resources includes those where the action and groups to which the user belonged appear in the access control list.

The disadvantage of access control lists is that they are hard to maintain, take a significant amount of space to store and do not reflect the policy that was used to assign users and actions to resources. This is particularly a problem in systems where new objects are being generated dynamically and frequently.

This disadvantage still holds for role-based systems that use access control lists. Although the problem is potentially reduced by using roles instead of users in an access control list, since roles are less dynamic, there is still the problem of maintaining the lists. Policy-based approaches alleviate the maintenance problem, but introduce the problem of how to quickly generate the list of resources a user can access.

U.S. Pat. No. 6,237,036 discloses a method for taking a set of policies, expressed as rules, and then applying the set of policies to a set of resources to generate a set of access control lists for a given set of users. Whenever any item of information such as a rule, a resource or a user changes, the set of access control lists needs to be regenerated or recompiled. This approach suffers from the problem that the access control lists can get out of sync with the policies and the current state of the system. Also, this approach does not address the problem of efficiently generating a list of resources on which a given user can perform a given action. While it may be possible to iterate through all resources and check the access control lists, this approach is inefficient.

U.S. Pat. No. 6,014,666 discloses a method which defines roles at development time. Authorization checks are performed in the code based on the roles. At deployment time, users and groups are mapped to roles. This is essentially the Enterprise JavaBeans (EJB) security model, with the disadvantage that there are no deployment descriptors.

This approach effectively hard codes the role-based authorization policies in the code and in that way is equivalent to the typical hard coding approach mentioned above. Also, this approach does not directly address the problem of generating lists of accessible resources for a given user, and is not for a policy-based authorization system.

Thus, there is a need for improved techniques for providing access control or authorization in computing systems.

SUMMARY OF THE INVENTION

The present invention provides such improved techniques for providing access control or authorization in computing systems.

In one aspect of the invention, an automated technique implemented in a computer system for selecting one or more resources on which a principal is authorized to perform at least one action, if any, comprises the following steps/operations. First, one or more authorization policies that apply to a given principal, if any, are selected. Then, the one or more authorization policies are transformed based on meta-information associated with the one or more resources so as to form a query against a resource store that selects the one or more resources on which the one or more authorization policies allow the given principal to perform the at least one action. The query may then be executed to select the one or more resources from the resource store. The term "principal" is to be understood to refer to some entity or source, e.g., a user, a computer program, etc., which seeks access to one or more resources.

Preferably, the one or more authorization policies are explicitly represented. Also, the one or more authorization policies are preferably prestored in a policy store, while the meta-information is preferably prestored in a meta-information store. Still further, in a preferred embodiment, the query is formed in accordance with the Standard Query Language (SQL), if the resource store is a relational database, and the Lightweight Directory Access Protocol (LDAP), if the resource store is a directory.

In another aspect of the invention, an automated technique implemented in a computer system for selecting one or more resources on which a principal is authorized to perform at least one action, if any, comprises the following steps/operations. First, one or more authorization policies that apply to a given principal, if any, are selected. A query against a resource store that selects resources from the resource store is then formed based on meta-information associated with the one or more resources. The query is executed to select the resources from the resource store. Then, one or more resources are removed from the selected resources on which the one or more authorization policies do not allow the given principal to perform the at least one action, if any, so as to select the one or more resources on which the one or more authorization policies allow the given principal to perform the at least one action.

Accordingly, by way of example, the invention advantageously provides techniques for efficiently generating a list of one or more resources for which a given user is authorized to perform a given action or a set of actions in a way that is configurable, e.g., based on a set of authorization policies that can be changed and put into effect without a need to modify the application.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a flow diagram illustrating an access control methodology according to another embodiment of the present invention.

DETAILED DESCRIPTION OF PREFERRED EMBODIMENTS

Figure 1:
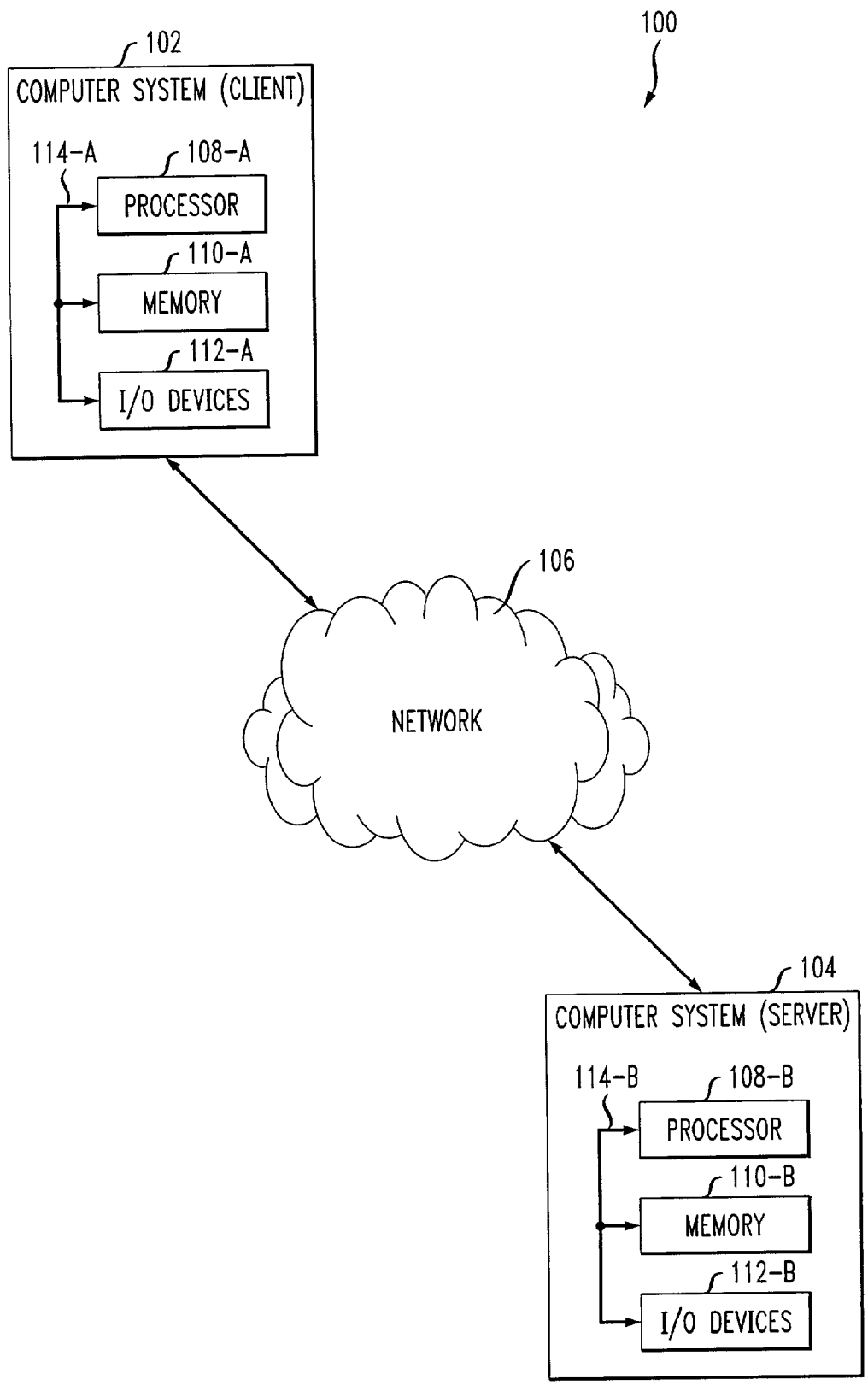
FIG. 1 is a block diagram illustrating an exemplary computing system in which the present invention may be implemented.

The present invention will be explained below in the context of an illustrative computing system, namely, an electronic marketplace or "e-marketplace." As is known, an e-marketplace generally refers to one or more web sites which serve to enable business-to-business electronic commerce or "B2B e-commerce" between users. However, it is to be understood that the present invention is not limited to such a particular computing system. Rather, the invention is more generally applicable to any computing system in which it is desirable to implement improved techniques for providing access control or authorization with respect to principals, e.g., users or computer programs, attempting to access resources associated with such computing system.

Frequently, applications (such as e-marketplace applications) must present a user with a list of resources to select from when performing an action. For example, the user is presented with a list of user profiles when performing user administration, or a list of orders when canceling an order. The list should include only those instances of the resource on which the user is allowed to perform the action. In the present example, this may include the list of user profiles on which the current user can perform administration tasks or the list of orders that the user is authorized to cancel.

In a post-filtering approach to access control, ineligible instances of a resource are filtered out of a result set after they are retrieved. Basically, a program fetches all the possible results and filters the result set by checking each one. This approach is efficient only if nearly all the retrieved instances pass the filter and the filter can be applied efficiently. For most users, this is not the case and post-filtering is too inefficient.

The other option, i.e., a pre-filtering approach to access control, is what is typically done in hard coded resource level access control. In this approach, a query, such as a Standard Query Language (SQL) select statement, is augmented to only return instances that the current user can access. For example, the SQL statement may select only entries that the user owns and public offerings. The problem is that this is not the case for organization administrators and for the site administrator. To accommodate all the special cases, the command ends up encoding the complete access control scheme for this given resource.

An approach of the present invention is provide an automated methodology that examines applicable access policies to construct a part of a query that returns only instances that a current user can access. The resulting query can further be refined to only select those items that the business process requires. For example, the automatically generated query could restrict a user to seeing only a portion of the orders in an order system. When displaying orders for approval, one would want to further restrict the display to only displaying unapproved orders that the user was allowed to view. User-specified constraints, such as search criteria may also be used to further filter the set of results returned.

One advantage of this inventive approach is that it avoids hard coding the access control policy and having to account for all possible access patterns in each list command. In order to construct such a query, meta-information about how each object is persistently stored in a database is recorded. This information along with policies that apply for a given class of resources and a given principal, e.g., user or computer program, are used to construct the appropriate query.

In one embodiment of the invention, as will be explained below, such functionality may be provided by a software component that supplies a function to generate an SQL where clause that limits the result set to those items on which the logged-on user can use a list command. Similarly, the same function may be provided for other query languages and repositories, such as the Lightweight Directory Access Protocol (LDAP). Thus, it is to be understood that the present invention is not limited to any particular query language or computing system architecture. As will be explained and illustrated below, a component which provides such unique functionality is referred to herein as an access policy manager.

Referring initially to FIG. 1, a block diagram illustrates an exemplary computing system in which the present invention may be implemented. By way of example, the computing system 100 may represent at least a portion of an e-marketplace wherein a user communicates via a computer system 102 (referred to illustratively as a "client" or client device) with another computer system 104 (referred to illustratively as a "server") via a network 106. The network may be any suitable network across which the computer systems can communicate, e.g., the Internet or Word Wide Web, local area network, etc. However, the invention is not limited to any particular type of network. In fact, it is to be understood that the computer systems may be directly linked without a network. Further, while only two computer systems are shown for the sake of simplicity in FIG. 1, it is to be understood that in a typical e-marketplace architecture, in which the invention may be implemented, the network may link a plurality of client devices and a plurality of servers.

However, it is also to be appreciated that the techniques of the invention may be implemented on a single computer system.

Further, FIG. 1 generally illustrates an exemplary architecture for each computer system communicating over the network. As shown, the client device 102 comprises a processor 108-A, memory 110-A and I/O devices 112-A, all coupled via a computer bus 114-A. Similarly, server 104 comprises a processor 108-B, memory 110-B and I/O devices 112-B, all coupled via a computer bus 114-B.

It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed, persistent memory device (e.g., hard drive), or a removable, persistent memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, as described herein, may be stored in one or more of the associated memory devices, e.g., ROM, fixed or removable memory, and, when ready to be utilized, loaded into RAM and executed by the CPU.

Figure 2:
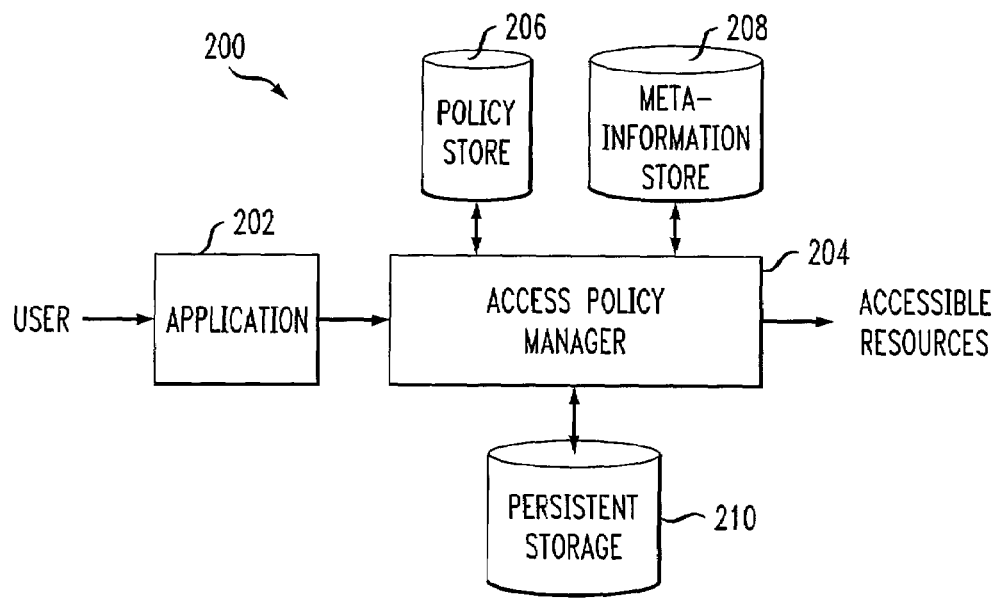
FIG. 2 is a block diagram illustrating an access control system according to one embodiment of the present invention.

Referring now to FIG. 2, a block diagram illustrates an access control system according to one embodiment of the present invention. It is to be understood that the access control system 200 may be accessed by an application 202 with which a user is interfacing in order to ensure that the user is provided (in response to a request by the user in accordance with the application) only resources which the user is authorized to access (i.e., accessible resources). As shown, the access control system 200 (which may also be considered an authorization system) comprises an access policy manager 202, a policy store 206, a meta-information store 208 and persistent storage 210.

With reference again to FIG. 1, it is to be understood that the access control system 200 may be implemented on server 104 where the processor 108-B executes the computer code which embodies the functionality of the access policy manager 204, and memory 110-B includes storage capacity suitable for maintaining the policy store 206, the meta-information store 208 and the persistent storage 210. The application 202 may execute in part on the client device 102 and in part on the server 104. Alternately, the application 202 may execute in whole on the client device 102 or in whole on the server 104. Also, the functional elements of the access control system 200 and the application 202 may be implemented on a single computer system or two or more computer systems.

Figure 3:
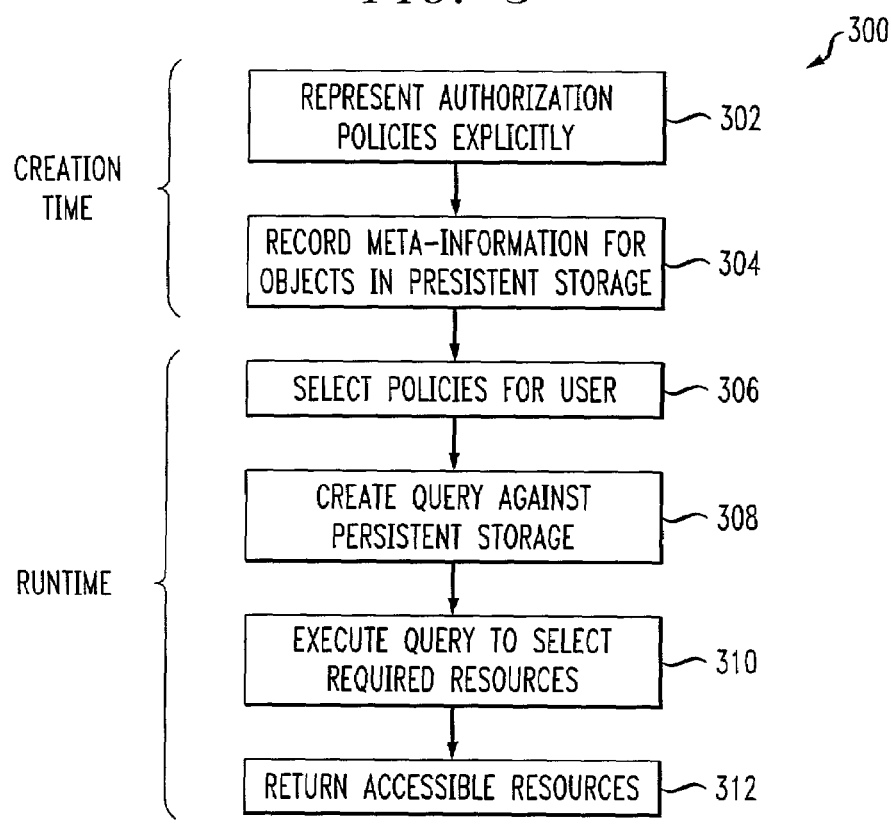
FIG. 3 is a flow diagram illustrating an access control methodology according to one embodiment of the present invention.

Referring now to FIG. 3, a flow diagram illustrates an access control methodology according to one embodiment of the present invention. More specifically, methodology 300 illustrates a process for efficiently selecting a set of resources on which a principal is authorized to perform an action or set of actions. It is to be understood that such methodology 300 may be implemented in accordance with the access control system 200 of FIG. 2. Thus, reference will be made back to the functional elements of FIG. 2 during the explanation of methodology 300.

As shown, the steps of methodology 300 are divided into "creation time" steps and "runtime" steps. That is, the creation time steps are steps that are performed prior to the access control system being made available for access by an application seeking to obtain the authorized set of resources (e.g., offline). The runtime steps are steps that are performed when the access control system is being accessed by an application (e.g., online). It is to be understood that the access control manager 204 may be used to perform steps 302 through 312. However, alternatively, a separate system (not shown) may be used to perform the creation time tasks of steps 302 and 304.

Accordingly, in step 302, one or more authorization policies are explicitly represented and stored in policy store 206. The authorization policies may be generated manually by a system administrator, automatically, or by some combination thereof. An authorization policy is typically a declarative statement about the type of access that is allowed or denied. The policy may include conditions on the request, such as the type of device, the time of day, the connection protocol, the properties of the requesting users or system, etc. The policy may also include conditions on the resources to which access is being requested. Further, the policy may include conditions on the relationships between the requester, the resource and associated organizations and groups.

In any case, the one or more policies are preferably represented such that they are sufficiently rich to express the intent of the authorization policy without being so complex as to be untranslatable into a query language such as SQL.

Next, in step 304, meta-information about the manner in which objects (e.g., resources) are stored in persistent storage 210 is recorded in meta-information store 208. More specifically, the meta-information specifies how the attributes describing a resource are mapped into the native representation used in the resource store (e.g., persistent storage 210). For example, the meta-information may specify how the attributes in a Java object are mapped to database tables and columns. This information is important since there are typically many ways to map a resource representation into a native resource store representation and the query used to select a set of resources typically depends on the native representation.

Turning now to runtime, in response to a given request by a user via the application 202 to perform some task on one or more resources, step 306 selects the policies from policy store 206 that apply to the user. Then, in step 308, using at least a portion of the meta-information recorded in meta-information store 208, the selected policies are transformed to create a query against the persistent store 210 that selects the set of resources that the policies allow.

Then, in step 310, the query is executed by the access policy manager 204 in accordance with the persistent store 210 to select the set of resources from the persistent store 210 that the policies allow. In step 312, the accessible resources are returned to the application for presentation to the user in order that the user may perform a task or action.

Referring now to FIG. 4, a flow diagram illustrates an access control methodology according to another embodiment of the present invention. More specifically, methodology 400 illustrates a process for efficiently selecting a set of resources on which a principal is authorized to perform an action or set of actions when a policy can not be transformed into a query.

By way of example, such a situation arises when the resource store does not contain all the derivable information about the resource, and the authorization policy depends on this derivable information. For example, a user may be able to purchase office supply items where the total costs, including shipping and taxes, is less then $100. The resource store includes the sales price, but not the total since shipping and taxes depend on the state to which the item will be sent. Rather than store a large number of total prices for each item, the application code calculates the total price once the item is loaded into the application. In this case, a query could be created to select only office supply items, or even only office supply items where the sales price was less than $100. However, there is no way to create a query to select only items where the total cost is less than $100. To handle this case, the query generated in accordance with the techniques of the invention includes all constraints that could be translated into terms in the query. Additional constraints may be enforced through post filtering. An authorization engine (e.g., access policy manager 204) could be invoked to check the additional constraints on each item after it was received.

Again, it is to be understood that methodology 400 of FIG. 4 may be implemented in accordance with the access control system 200 of FIG. 2. Thus, reference again will be made back to the functional elements of FIG. 2 during the explanation of methodology 400.

As shown, the steps of methodology 400 are divided into "creation time" steps and "runtime" steps. These terms have the same meaning and may be performed by the same elements as explained above.

Like methodology 300 of FIG. 3, methodology 400 begins, in step 402, by explicitly representing one or more authorization policies and storing them in policy store 206. The authorization policies may be generated in the same manner as explained above. Next, in step 404, meta-information about the manner in which objects are stored in persistent storage 210 is recorded in meta-information store 208.

Turning now to runtime, in response to a given request by a user via the application 202 to perform some task on one or more resources, step 406 selects the policies from policy store 206 that apply to the user.

Then, in step 408, using at least a portion of the meta-information recorded in meta-information store 208, a query is created against the persistent store 210 that selects the superset of resources that the policies allow. The selected set satisfies all policy constraints that could be translated into the query, but may not satisfy all the constraints, e.g., those constraints on calculated attributes that are not stored in the resource store.

Then, in step 410, the query is executed by the access policy manager 204 in accordance with the persistent store 210 to select a superset of resources from the persistent store 210. In step 412, the resource superset is culled or pruned to remove inaccessible resources based on the complete criteria in the authorization policies, including constraints that can and cannot be translated into terms in the query. Lastly, in step 414, the accessible resources are returned to the application for presentation to the user in order that the user may perform a task or action.

It is to be appreciated that methodologies 300 (of FIG. 3) and 400 (of FIG. 4) described above may return no resources (i.e., an empty set) on which the user is allowed to perform an action, if, for example, no such resources are stored in the persistent storage 210. Also, it may also be that no authorization policy in the policy store 206 applies to the user.

To more clearly illustrate the details of the access control methodologies of the present invention explained above, consider the example of a "simpleBuySideOffering" which, in the context of an B2B e-commerce web site, is a representation of an item that a buyer is offering to buy from a set of supplies. Suppose that the object is represented in a database using a primary table (table 1 below) to hold the main contents and a secondary table (table 2 below) that stores the membership relations. It is to be understood that table 1 and table 2 below may contain more information for actual offerings, but they have sufficient data for illustrating this example. It is also to be understood that such table definitions represent the data stored in persistent storage 210.

TABLE 1

SimpleBuyOffering

| Column Name | Data Type | Description |
| --- | --- | --- |
| SimpleID | Long integer (not null) | The primary key for the simple buy side offering. |
| State | Integer (not null) | This is the state of the object. Draft = 0, Active = 1, Canceled = 2, Complete = 3. |
| Name | Varchar (265) | The name of the simple offering |
| Product | Long integer (not null) | The product reference number, and other columns to link to the catalog. |
| Owner | Long integer (not null) | Member id, external reference to the member table. |
| Public | Boolean | Flag to indicate if the offering is public. |
| ... | ... | ... |

TABLE 2

SimpleBuyRel

| Column Name | Data Type | Description |
| --- | --- | --- |
| SimpleID | Long integer (not null) | The primary key for the simple buy side offering. |
| Relation | Varchar(128) | Relation between the member and the offering. |
| Member | Long integer (not null) | The member reference number. External relationship. |
| ... | ... | ... |

Suppose that a buyer, Memberid=345, wants to shows all the simple buy side offerings, on which a "view action" can be executed. Such a view action command will, at some point, execute a select statement to get the list of simple buy side offerings to display. Assume also that, in the context of a state machine implementation of the operations, this transition applies only to simple offerings in the active state. The command would typically construct a select statement that selects all the simple offerings that the transition applies to, independent of the guard: "Select SimpleID, Name from simpleSellSideOffering where state=1". This SQL statement could be used to fetch all the simple buy side offerings for display, without any access control considerations. The command could use this SQL statement to fetch the results and then do post-filtering to remove the results that do not pass the access control test. However, for reasons explained above, such post-filtering would be inefficient.

In accordance with the present invention, an access policy manager 204 supplies a function that returns an additional part of the SQL where clause to select only the items that pass the access control filter: AccessPolicyManager.getAccessClause(context, action, simpleBuySideOffering.class)⇒ returns a string.

In this case, the returned string would be: "(refNum in select refnum from simpleSellSideOffering as p, simpleSellSideOfferingRel as r where ((p.creater=345) or (p.refNum=r.refNum and r.memberid=345 and r.relationship="recipient") or (p.public=true))".

Internally, the function operates by using meta-information about the resource obtained from meta-information store 208, for example, the resource's relationships to members and the attributes used for grouping. This information includes the table name, the column name and preferably the data type of the attribute. Table 3 illustrates meta-information for use in accordance with this example:

Primary Table: SimpleBuySideOffering
Primary Key Column: SimpleID
Relation Table: SimpleBuyRel
Relation Join Column: SimpleID
Relation Column: Relation
Relation Member Column: Member

TABLE 3

Meta-information

| Attribute | Table | Column | Data type |
|---|---|---|---|
| Owner | SimpleBuySideOffering | Owner | Long |
| Public | SimpleBuySideOffering | Public | Boolean |
| Recipient | SimpleBuyRel | Relation | String |
| Creator | SimpleBuyRel | Relation | String |

To illustrate how the meta-data is used, the above example is continued in order to explain the operations of the above-mentioned AccessPolicyManager.getAccessClause. In accordance with the getAccessClause call, the access policy manager retrieves a set of policies from the policy store 206 that are potentially applicable to the given user using a particular get filter method. This corresponds to step 306 (406) in FIG. 3 (FIG. 4). This may be represented as:
Policy Filter=Policy Manager.getFilter(user, SimpleBuySideOfferingviewTransition,simpleBuySide
Offering.class)⇒returns
{[Buyers, BuyerOwnerActions, Offerings, owner]
[Buyers, BuyerRecipientActions,Offerings, recipient]
[Buyers, BuyerPublicActions, PublicOfferings,]}

Each of the policies gets translated into a policy clause and the policy clauses are then "OR"ed together to get the access clause. This corresponds to step 308 (408) in FIG. 3 (FIG. 4). The general form of the access clause is: refNum in select refnum from simpleSellSideOffering as p, simpleSellSideOfferingRel as r where (<policyClause1>or <policyClause2> . . . ).

[Buyers, BuyerOwnerActions, Offerings, owner]⇒
>(p.owner=345)

[Buyers, BuyerRecipientActions,Offerings, recipient]⇒
(p.refNum=r.refNum and r.memberid=345 and r.relationship='recipient')

Buyers, BuyerPublicActions, PublicOfferings,]⇒
(p.public=true)

Putting the above results together, the query to the persistent storage 210 is created as:

Select SimpleID, Name from simpleSellSideOffering where state=1 and (refNum in select refnum from simpleSellSideOffering as p, simpleSellSideOfferingRel as r where ((p.creater=345) or (p.refNum=sssor.refNum and p.memberid=345 and r.relationship='recipient') or (p.public=true))

Running the query against the persistent storage 210 (resource store) corresponds to step 310 (410) in FIG. 3 (FIG. 4).

It is to be appreciated that the policies retrieved refer to Offerings, a super class of SimpleBuySideOffering. However, since the class passed into the getAccessPolicy( ) method is the SimpleBuySideOffering, its meta-level information is used to generate the SQL.

Also, the inventive methodologies may be implemented at the application level, the language level, the persistent store level or the operating system level.

Thus, in accordance with the above example, a resource dictionary may be used to store the meta-information about all the resources in the system in meta-information store 208. The following information about the resources is preferably stored: (1) table names for the primary resource table; (2) column name of primary key in resource table (ResId); (3) column name of owner in resource table (ResOwner); (4) the Resource relationship table name; (5) column name of resource id in the relationship table; (6) column names of memberId; (7) column name of memberType (organization, user or group); and (8) column name of relationship. Equivalent information could be stored for other types of resource stores, such as LDAP directory servers. It may also be possible, in some cases, to avoid storing the meta-information if it can be procedurally recreated on demand from information in the resource store or other descriptions of the resource.

Then, the access policy manager 204 uses the above information to provide the following functionality: (1) use the meta-information about the resources and their attributes to construct the sub select query object that can be used for pre-filtering; (2) use the meta-information to filter out choices in the user interface (for defining the implicit resource groups, only groupings on attributes that are applicable are allowed); and (3) define resources in the resource dictionary.

It is to be appreciated that the techniques of the invention described herein may be used to augment the functionality described in the U.S. patent application identified as Ser. No. 09/624,399, filed Jul. 24, 2000, and entitled "Instance Level Access Control Based on Instance Relative Roles," the disclosure of which is incorporated by reference herein. The above-referenced patent application describes the use of a policy based authorization mechanism. Such a mechanism can serve, in accordance with the present invention, as a basis for providing policies to be translated into queries against the resource store as taught by the present invention. However, it is to be understood that the present invention may make use of any system that can store and retrieve authorization policy information.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An automated method implemented in a computer system for selecting one or more resources on which a principal is authorized to perform at least one action, the method comprising the steps of:

selecting a plurality of authorization policies that apply to a given principal;

transforming a first nonempty subset of the plurality of authorization policies based on meta-information associated with the one or more resources so as to form a query against a resource store that selects resources from the resource store;

executing the query to select the resources from the resource store;

removing one or more resources from the selected resources on which the given principal is not permitted to perform the at least one action in accordance with a second nonempty subset of the plurality of authorization policies, so as to select the one or more resources on which the plurality of authorization policies allow the given principal to perform the at least one action; and presenting the given principal the one or more resources on which the plurality of authorization policies allow the given principal to perform the at least one action.

2. The method of claim 1, wherein the one or more authorization policies are explicitly represented.

3. The method of claim 1, wherein the one or more authorization policies are prestored in a policy store.

4. The method of claim 1, wherein the meta-information is prestored in a meta-information store.

5. The method of claim 1, wherein the query is formed in accordance with the Standard Query Language (SQL).

6. The method of claim 1, wherein the query is formed in accordance with the Lightweight Directory Access Protocol (LDAP).

7. The method of claim 1, wherein the meta-information is procedurally derivable from the resources or information contained in the resource store.

8. Apparatus implemented in a computer system for selecting one or more resources on which a principal is authorized to perform at least one action, the apparatus comprising:

at least one processor operative to: (i) select a plurality of authorization policies that apply to a given principal; (ii) transform a first nonempty subset of the plurality of authorization policies based on meta-information associated with the one or more resources so as to form a query against a resource store that selects resources from the resource store; (iii) execute the query to select the resources from the resource store; (iv) remove one or more resources from the selected resources on which the given principal is not permitted to perform the at least one action in accordance with a second nonempty subset of the plurality of authorization policies, so as to select the one or more resources on which the plurality of authorization policies allow the given principal to perform the at least one action; and (v) present to the given principal the one or more resources on which the plurality of authorization policies allow the given principal to perform the at least one action; and memory, coupled to the at least one processor, for maintaining the resource store.

9. The apparatus of claim 8, wherein the one or more authorization policies are explicitly represented.

10. The apparatus of claim 8, wherein the one or more authorization policies are prestored in a policy store.

11. The apparatus of claim 8, wherein the meta-information is prestored in a meta-information store.

12. The apparatus of claim 8, wherein the query is formed in accordance with the Standard Query Language (SQL).

13. The apparatus of claim 8, wherein the query is formed in accordance with the Lightweight Directory Access Protocol (LDAP).

14. The apparatus of claim 8, wherein the meta-information is procedurally derivable from the resources or information contained in the resource store.

15. An article of manufacture for use in accordance with a computer system for selecting one or more resources on which a principal is authorized to perform at least one action, comprising a machine readable medium containing one or more programs which when executed implement the steps of:

selecting a plurality of authorization policies that apply to a given principal;

transforming a first nonempty subset of the plurality of authorization policies based on meta-information associated with the one or more resources so as to form a query against a resource store that selects resources from the resource store;

executing the query to select the resources from the resource store;

removing one or more resources from the selected resources on which the given principal is not permitted to perform the at least one action in accordance with a second nonempty subset of the plurality of authorization policies, so as to select the one or more resources on which the plurality of authorization policies allow the given principal to perform the at least one action; and presenting to the given principal the one or more resources on which the plurality of authorization policies allow the given principal to perform the at least one action.

* * * * *